Patented Dec. 29, 1931

1,838,577

UNITED STATES PATENT OFFICE

PAUL SCHUFTAN, OF HOLLRIEGELSKREUTH, NEAR MUNICH, GERMANY, ASSIGNOR TO GESELLSCHAFT FUR LINDE'S EISMASCHINEN A. G., OF HOLLRIEGELSKREUTH, NEAR MUNICH, GERMANY

PROCESS FOR THE PURIFICATION OF COKE OVEN GASES

No Drawing. Application filed July 9, 1929, Serial No. 377,071, and in Germany August 6, 1928.

Processes have been proposed for the separation of highly reactive constituents of coke oven gases preparatory to the further separation of the gaseous components of the gases by refrigeration. These undesired bodies, which are present in the gases in only small amount and as representatives of which there may be mentioned nitrogen oxides, cyclic diolefines and ketones, produce, as a result of chemical interaction during the refrigeration process, very objectionable deposits in the refrigeration apparatus.

The present invention resides in a new method for the complete separation of these bodies. The method has shown itself to be particularly effective and comprises passing the gases to be purified at low temperature over an adsorptive medium. The present method is distinguished from customary adsorption processes in that it is so conducted that the undesired bodies are not merely adsorbed and retained in the adsorptive medium, but due to the special catalytic action of the adsorptive medium, are caused to react with each other. The process depends, therefore, upon the simultaneous adsorption of different kinds of material out of the gases; the nitro compounds primarily formed are quickly and completely decomposed principally into carbon, nitrogen, carbon dioxide and water. As compared with known adsorption processes, the great economic advantage is thus attained that the adsorptive medium only becomes exhausted after a very long time since the adsorptive medium is continually regenerated by the rapid decomposition of the adsorbed material and is even added to by the formation of new highly active carbon.

In order to obtain this special catalytic effect of the adsorptive medium, it is necessary that the gases be previously freed to as great an extent as is possible from readily absorbable materials as well as materials which can act as contact poisons. Such materials include principally benzene hydrocarbons, hydrogen sulfid, carbon dioxide and water. The removal of these materials is effected by well known methods.

The catalytic effect of the adsorptive medium can be increased by impregnation with metals or metal salts, particularly with iron.

The method of carrying out the process is illustrated by the following detailed description of a specific example:

The gas is first purified as completely as possible from higher aromatic hydrocarbons of the benzene series, hydrogen sulfid, carbon dioxide and water, and after compression to a pressure of about 10 atmospheres is conducted at a temperature of about $-40°$ C. over active carbon impregnated with an iron salt. The oxids of nitrogen as well as cyclopentadienes and ketones are quantitatively adsorbed, and due to catalytic action of the adsorptive mass, are immediately converted into nitro-hydrocarbons which then rapidly decompose into carbon, carbon dioxide, water and nitrogen, and again set free the surface of adsorptive mass. In addition to the resulting complete removal in this manner of the mentioned impurities from the gases, the bulk of the acetylene content of the gases also is removed. Consequently, the formation of objectionable deposits in the fractionating apparatus in the subsequent treatment of the gases is completely avoided.

The catalytic activity of the active carbon used for purifying the gases as above described is not appreciably reduced by the treatment of more than 10,000 cubic meters of gas per kilogram of the carbon.

Only after a very long time do the adsorptive surfaces become saturated with easily adsorbable high molecular weight hydrocarbons so that a revivification becomes necessary. The revivification then advantageously is accomplished by heating the adsorptive mass in dry pure nitrogen, such as is commonly available in a coke oven gas separation plant.

This saturation of the carbon with high molecular weight hydrocarbons can be considerably delayed if the equipment for the catalytic treatment is preceded by a small adsorber in which the high molecular weight hydrocarbons are removed by simple adsorption.

Instead of active carbon other materials which exert a high adsorptive effect because of great surface, such as silica gel, can be used in carrying out the process.

I claim:

1. In a process of low temperature fractionation of coke oven gas the removal of traces of oxides of nitrogen together with noxious reactive hydrocarbons by passing the gas after the usual purification through a filter containing adsorptive mass, said treatment being carried out at subatmospheric temperature and under superatmospheric pressure.

2. In a process of low temperature fractionation of coke oven gas the removal of traces of oxides of nitrogen together with noxious reactive hydrocarbons by passing the gas after the usual purification through a filter containing adsorptive mass impregnated with a metal compound, said treatment being carried out at subatmospheric temperature and under superatmospheric pressure.

3. In a process of low temperature fractionation of coke oven gas the removal of traces of oxides of nitrogen together with noxious reactive hydrocarbons by passing the gas after the usual purification through a filter containing adsorptive mass impregnated with an iron compound, said treatment being carried out at subatmospheric temperature and under superatmospheric pressure.

4. In a process of low temperature fractionation of coke oven gas the removal of traces of oxides of nitrogen together with noxious reactive hydrocarbons by passing the gas after the usual purification through a filter containing adsorptive mass comprising active carbon, said treatment being carried out at subatmospheric temperature and under superatmospheric pressure.

5. In a process of low temperature fractionation of coke oven gas the removal of traces of oxides of nitrogen together with noxious reactive hydrocarbons by passing the gas after the usual purification through two successive filters containing adsorptive mass, said treatment being carried out at subatmospheric temperature and under superatmospheric pressure.

In testimony whereof, I affix my signature.

Dr. PAUL SCHUFTAN.